United States Patent
Hemnani

(10) Patent No.: US 10,181,667 B1
(45) Date of Patent: Jan. 15, 2019

(54) RECEPTACLE TERMINAL FOR A JUNCTION BOX

(71) Applicant: TE CONNECTIVITY CORPORATION, Berwyn, PA (US)

(72) Inventor: Dinesh Loku Hemnani, Greensboro, NC (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 0 days.

(21) Appl. No.: 15/991,042

(22) Filed: May 29, 2018

(51) Int. Cl.
    *H01R 13/187* (2006.01)
    *H01R 13/05* (2006.01)
    *H02G 3/08* (2006.01)

(52) U.S. Cl.
    CPC ......... *H01R 13/187* (2013.01); *H01R 13/055* (2013.01); *H02G 3/081* (2013.01)

(58) Field of Classification Search
    CPC .. H01R 13/187; H01R 31/00; H01H 85/2035; H02G 3/081
    USPC ........................................ 439/843
    See application file for complete search history.

(56) References Cited

U.S. PATENT DOCUMENTS

| 5,603,626 | A | * | 2/1997 | Oka | H01H 85/2035 439/224 |
| 5,755,579 | A | * | 5/1998 | Yanase | H01R 31/00 439/76.2 |
| 6,932,625 | B2 | | 8/2005 | Yagi et al. | |
| 7,381,065 | B2 | * | 6/2008 | Ikeda | H05K 7/026 439/76.2 |
| 9,444,183 | B2 | * | 9/2016 | Degen | H01R 13/627 |

* cited by examiner

*Primary Examiner* — Jean F Duverne

(57) ABSTRACT

A receptacle terminal includes a box having a front, a rear, first and second sides and first and second ends defining a cavity. A front blade slot is open at the front configured to receive a first blade terminal. A rear blade slot is open at the rear configured to receive a second blade terminal. A spring contact is in the cavity between the front blade slot and the rear blade slot and includes a first mating interface configured to engage the first blade terminal when received in the front blade slot and a second mating interface configured to engage the second blade terminal when received in the rear blade slot. The first end is split including a first flap and a second flap facing each other at a seam. The first flap and the second flap are independently movable relative to each other.

20 Claims, 4 Drawing Sheets

RECEPTACLE TERMINAL FOR A JUNCTION BOX

BACKGROUND OF THE INVENTION

The subject matter herein relates generally to receptacle terminals for a junction box.

Junction boxes are used to electrically connect electrical devices and electrical components. For example, junction boxes may be used as battery distribution units for battery systems for electric vehicles or hybrid vehicles. The junction box manages the power capacity and functionality of the battery system by electrically connecting electrical components, such as relays, fuses or other electrical components to electrical devices, such as sensors, connectors, bus bars or other devices.

Conventional junction boxes may use wire harnesses or other connecting elements to electrically connect the various components and devices. Assembly using wire harnesses is time consuming. Other conventional junction boxes use terminals to connect the various components and devices. However, the terminals are typically bulky, increasing the overall size of the junction box. The terminals may have high mating forces, requiring the use of lubrication to lower the mating forces and improve performance. Additionally, conventional terminals may have specific mating requirements and may limit the size or shape of the components the terminals are connected to.

There is a need for a robust electrical terminal for use in junction boxes.

BRIEF DESCRIPTION OF THE INVENTION

In one embodiment, a receptacle terminal is provided including a box having a front and a rear, first and second sides and first and second ends. The box defines a cavity. A front blade slot is open at the front configured to receive a first blade terminal. A rear blade slot is open at the rear configured to receive a second blade terminal. A spring contact is in the cavity between the front blade slot and the rear blade slot and includes a first mating interface configured to engage the first blade terminal when received in the front blade slot and a second mating interface configured to engage the second blade terminal when received in the rear blade slot. The first end is split including a first flap and a second flap facing each other at a seam. The first flap and the second flap are independently movable relative to each other.

In another embodiment, a receptacle terminal is provided including a box having a front and a rear, first and second sides extending between the front and the rear, and first and second ends extending between the front and the rear. The box defines a cavity. A spring contact is in the cavity and includes a first mating interface configured to engage a first blade terminal and a second mating interface configured to engage a second blade terminal. A front blade slot is located between the first end and the spring contact and is open at the front to receive the first blade terminal. A rear blade slot is located between the second end and the spring contact and is open at the rear to receive the second blade terminal. The first end has a first end mating interface having multiple points of contact for engaging the first blade terminal at discrete locations. The first mating interface of the spring contact has multiple points of contact for engaging the first blade terminal at discrete locations.

In another embodiment, a junction box configured to hold an electronic component having a first blade terminal and an electronic device having a second blade terminal is provided including a housing holding the electronic device and a receptacle terminal coupled to the second blade terminal of the electronic device. The receptacle terminal includes a box having a front and a rear, first and second sides extending between the front and the rear, and first and second ends extending between the front and the rear. The box defines a cavity. A front blade slot is open at the front and a rear blade slot is open at the rear. The receptacle terminal includes a spring contact in the cavity between the front blade slot and the rear blade slot. The spring contact has a first mating interface and a second mating interface. The receptacle terminal receives the second blade terminal in the rear blade slot between the second mating interface of the spring contact and the second end. The receptacle terminal receives the first blade terminal in the front blade slot between the first mating interface of the spring contact and the first end. The first end is split including a first flap and a second flap facing each other at a seam. The first flap and the second flap are independently movable relative to each other to engage the first blade terminal.

DETAILED DESCRIPTION OF THE INVENTION

Figure 1:
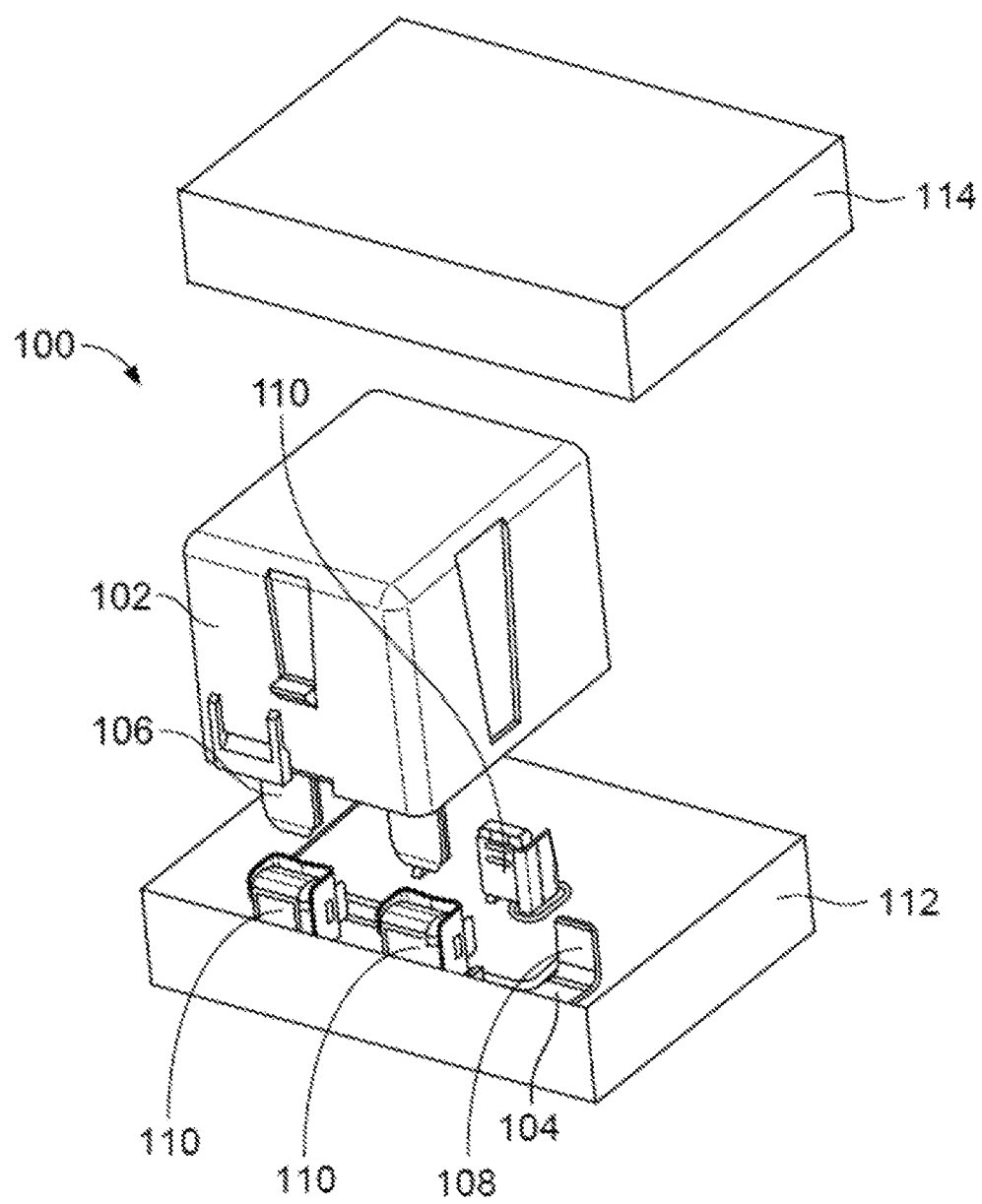
FIG. 1 illustrates a junction box in accordance with an exemplary embodiment.

FIG. 1 illustrates a junction box 100 in accordance with an exemplary embodiment. The junction box 100 is used to electrically connect one or more electrical components 102 and one or more electrical devices 104. The junction box 100 includes one or more receptacle terminals 110 configured to be electrically connected to corresponding electrical components 102 and/or corresponding electrical devices 104. In an exemplary embodiment, the receptacle terminal 110 is a double ended receptacle terminal configured to receive blade terminals 106, 108 from corresponding electrical components 102 and electrical devices 104, respectively. For example, the receptacle terminal 110 receives the first blade terminal 106 from the electrical component 102 at a front of the receptacle terminal 110 and the receptacle terminal 110 receives the second blade terminal 108 from the electrical device 104 and a rear of the receptacle terminal 110. The receptacle terminal 110 electrically connects the first blade terminal 106 of the electrical component 102 with the second blade terminal 108 of the electrical device 104.

In an exemplary embodiment, the junction box 100 is used with a battery system. For example, the junction box may be a battery distribution unit (BDU) of a battery pack. The battery pack and the BDU may be part of a high voltage energy storage system. For example, the battery pack and the BDU may be used in an automotive application, such as part of an electric vehicle or a hybrid electric vehicle. The BDU is used to manage the power capacity and functionality of the battery system, such as by measuring current and regulating power distribution of the battery pack. The battery system may have both a high current power circuit and a low current power circuit, both electrically connected to the battery pack through the BDU. The BDU may monitor and/or control the operation of the components of the battery system. The BDU may measure or react to the battery health of the battery pack. The BDU may measure or react to the battery status of the battery pack. The BDU may monitor for or react to overvoltage and/or low voltage situation with the battery pack. The BDU may react due to the temperature changing of the battery pack. The BDU may manage charging functions of the battery pack. The BDU may have external connections and/or connectors, such as for attaching power terminals to the BDU and/or the battery pack, for attaching sensors to the BDU, for communicating data to/from the BDU, and the like. The electrical components 102 and electrical devices 104 may form components of the BDU.

The junction box 100 includes a housing 112 for holding the electrical components 102 and electrical devices 104 and a cover 114 (a portion of which is shown in FIG. 1) for covering the electrical components 102 and electrical devices 104 therein. In an exemplary embodiment, the housing 112 is manufactured from a dielectric material, such as a plastic material. In an exemplary embodiment, the receptacle terminals 110 are coupled to the blade terminals 108 of corresponding electrical devices 104. For example, the receptacle terminals 110 are plugged onto the blade terminals 108. In other various embodiments, the receptacle terminals 110 may be held by the housing 112 and the electrical devices 104 are then coupled to the housing 112 such that the blade terminals 108 are plugged into the receptacle terminals 110.

In various embodiments, the electrical devices 104 include printed circuit boards, leadframes, buss bars, wire harnesses, electrical connectors, or other components including or having terminals, such as the blade terminals 108 for electrical connection to the receptacle terminals 110. The electrical devices 104 may include a positive battery terminal and a negative battery terminal for electrical connection with other components, such as the battery system. The battery terminals may be electrically connected to other electrical devices 104, such as by corresponding printed circuit boards, leadframes, buss bars, wire harnesses, and the like. The electrical devices 104 may include one or more sensor connectors, control modules, and the like for controlling functions of the junction box 100. The electrical devices 104 may include a manual service disconnect (MSD) for disconnecting power circuits of the junction box 100, such as for service.

In various embodiments, the electrical components 102 are removably coupled to the junction box 100. For example, the electrical components 102 are coupled to the junction box 100 by plugging the blade terminals 106 into the receptacle terminals 110. The blade terminals 106 are flat terminals having a generally rectangular shape. Distal ends of the blade terminals 106 may be chamfered to facilitate mating with the receptacle terminals 110. Any type of electrical components 102 may form part of the junction box 100 depending on the particular application. For example, the electrical components 102 may include a power relay, a pre-charge relay, a pre-charge resister, a fuse, a capacitor, a sensor, and the like.

In various embodiments, the electrical devices 104 define electrical paths between corresponding electrical components 102. For example, the electrical device 104 may include a strip busbar that are routed within the housing 112 between the corresponding electrical components 102. However, in alternative embodiments, the electrical device 104 may include a printed circuit board having the blade terminals 108 mounted thereto for electrical connection to the electrical components 102 via the receptacle terminals 110. Optionally, the electrical devices 104 are held in the housing 112 and coupled to the receptacle terminals 110 from below while the electrical components 102 are coupled to the receptacle terminals 110 from above. The receptacle terminals 110 allow convenient and simple connections to the blade terminals 106, 108. The receptacle terminals 110 allow the electrical components 102 to be quickly plugged in or unplugged from the junction box 100. The receptacle terminals 110 may eliminate some or all wired connections to the electrical components 102, reducing assembly time of the junction box 100.

Figure 2:
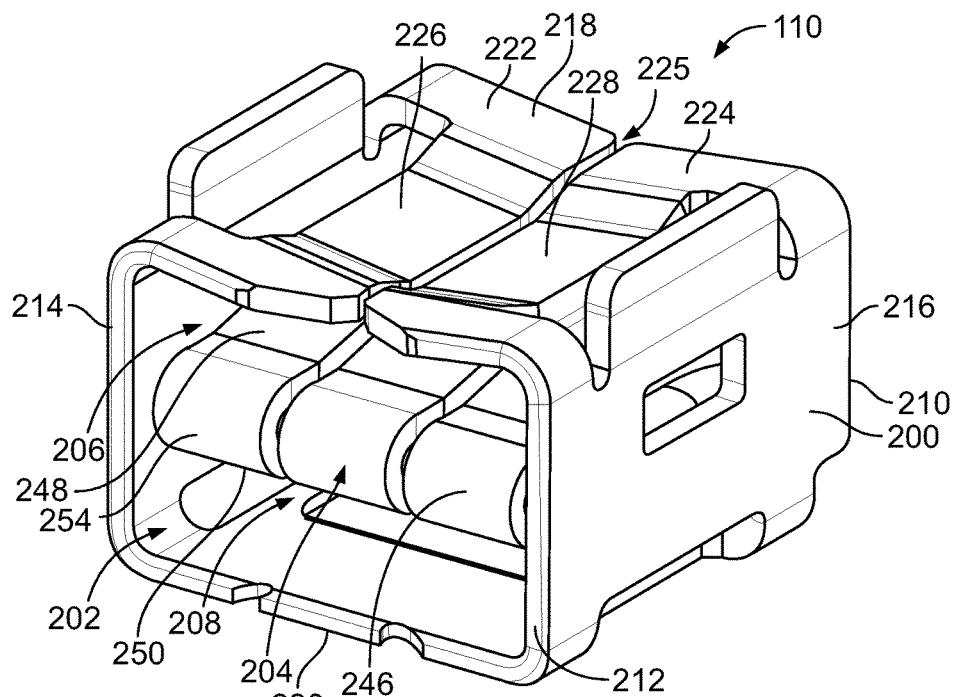
FIG. 2 is a rear perspective view of a receptacle terminal formed in accordance with an exemplary embodiment.
Figure 3:
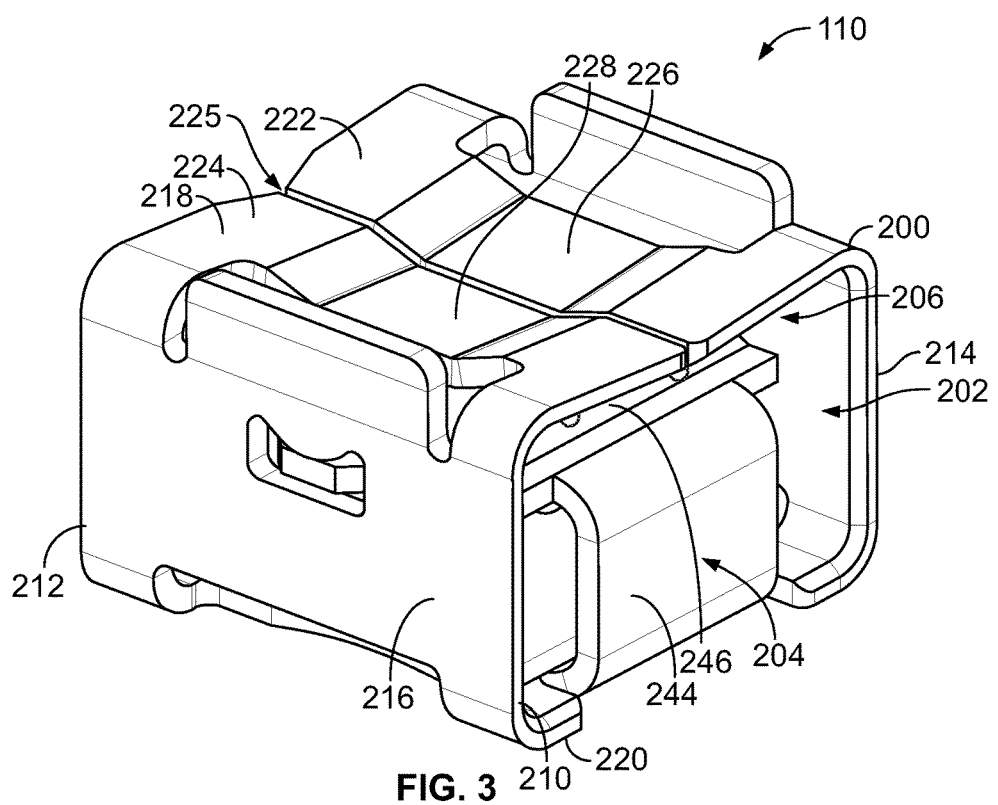
FIG. 3 is a front perspective view of the receptacle terminal shown in FIG. 3.
Figure 4:
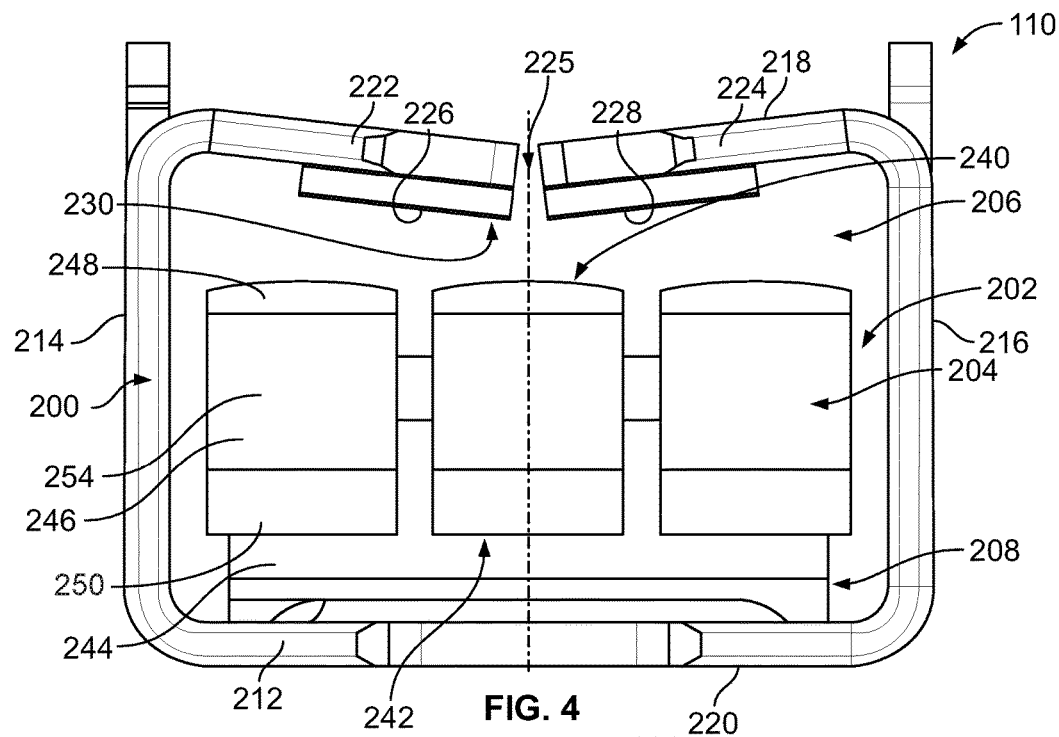
FIG. 4 is a rear view of the receptacle terminal shown in FIG. 3.
Figure 5:
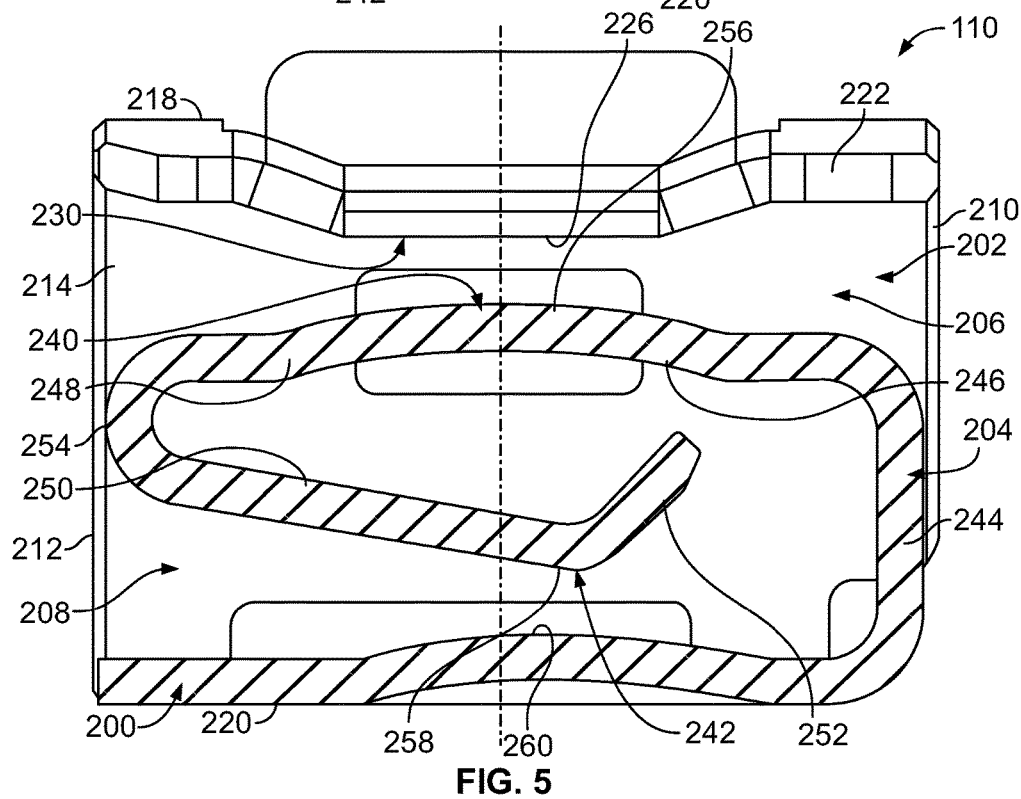
FIG. 5 is a cross-sectional view of the receptacle terminal shown in FIG. 3.

FIG. 2 is a rear perspective view of one of the receptacle terminals 110 formed in accordance with an exemplary embodiment. FIG. 3 is a front perspective view of the receptacle terminal 110 shown in FIG. 3. FIG. 4 is a rear view of the receptacle terminal 110 shown in FIG. 3. FIG. 5 is a cross-sectional view of the receptacle terminal 110 shown in FIG. 3.

The receptacle terminal 110 includes a stamped and formed body formed into a box 200. The receptacle terminal 110 includes a plurality of wall segments forming the box 200 and defining a cavity 202. The receptacle terminal 110 includes a spring contact 204 extending into the cavity 202. The spring contact 204 is configured to be electrically connected to the corresponding blade terminals 106, 108 (both shown in FIG. 1).

In an exemplary embodiment, the cavity 202 includes a front blade slot 206 configured to receive the first blade terminal 106 and a rear blade slot 208 configured to receive the second blade terminal 108. The spring contact 204 separates the front blade slot 206 and the rear blade slot 208. In an exemplary embodiment, the blade slots 206, 208 receive the blade terminals 106, 108 in parallel orientations from different sides of the box 200.

The box 200 includes a front 210 and a rear 212. The box 200 has first and second sides 214, 216 extending between the front 210 and the rear 212. The box 200 has first and second ends 218, 220 extending between the front 210 and the rear 212. The sides 214, 216 extend upward from the second end 220 and, in the illustrated embodiment, are generally perpendicular to the second end 220.

In an exemplary embodiment, the first end 218 is open. For example, the first end 218 is non-continuous. The first end 218 includes a first flap 222 and a second flap 224 with a seam 225 between the first flap 222 and the second flap 224. The first flap 222 extends inward toward the second flap 224 from the first side 214. The second flap 224 extends inward toward the first flap 222 from the second side 216. Optionally, the first flap 222 and the second flap 224 may be close to touching at the seam 225. In other various embodiments, the first flap 222 may engage the second flap 224 at the seam 225. In an exemplary embodiment, the flaps 222, 224 are angled inward into the cavity 202, such as being angled toward the spring contact 204. For example, the flaps 222, 224 are higher at the sides 214, 216 and lower at the seam 225. Optionally, the flaps 222, 224 are nonparallel to the second end 220. Optionally, the flaps 222, 224 are non-perpendicular relative to the sides 214, 216, but rather are angled at an acute angle relative to the corresponding sides 214, 216.

In an exemplary embodiment, having the first end 218 open allows deflection of the flaps 222, 224 when the first blade terminal 106 is loaded in the first blade slot 206. Deflection of the flaps 222, 224 may cause deflection of the sides 214, 216. When the flaps 222, 224 and/or the sides 214, 216 are deflected, the metal of the box 200 is elastically deformed such that the flaps 222, 224 are spring biased against the first blade terminal 106. The box 200 is an enlarged when the first blade terminal 106 is loaded in the first blade slot 206 when the first flap 222 and/or the first side 214 are spread apart from the second flap 224 and/or the second side 216.

In an exemplary embodiment, the first end 218 includes one or more pads configured to engage the first blade terminal 106 the first blade terminal 106 is received in the first blade slot 206. For example, the first flap 222 includes a first pad 226 and the second flap 224 includes a second pad 228. The pads 226, 228 extend inward into the cavity 202. For example, the pads 226, 228 are formed and bent inward relative to other portions of the flaps 222, 224. Optionally, the pads 226, 228 may be approximately centered between the front 210 and the rear 212; however, the pads 226, 228 may be at other locations in alternative embodiments.

The first end 218 has a first end mating interface 230 configured to engage the first blade terminal 106 when received in the first blade slot 206. In an exemplary embodiment, the first end mating interface 230 may be defined by the pads 226, 228. For example, the pads 226, 228 may include flat portions that are the innermost portions of the pads 226, 228 and that define the mating interface 230. Optionally, the first end mating interface 230 has multiple points of contact with the first blade terminal 106. For example, the first flap 222 defines part of the mating interface 230 and the second flap 224 defines another part of the mating interface 230. The first pad 226 of the first flap 222 defines a point of contact with the first blade terminal 106 and the second pad 228 of the second flap 224 defines another point of contact with the first blade terminal 106. In alternative embodiments, rather than having the pads 226, 228, the flaps 222, 224 may have other features defining the contact points of the mating interface 230. For example, protrusions, bumps, tabs, spring beams or other elements may be formed on or extend from the flaps 222, 224 to define the mating interface 230.

In an exemplary embodiment, the front blade slot 206 is open at the front 210, such as to receive the blade terminal 106. Optionally, the front blade slot 206 may be open at the rear 212, such as to receive the blade terminal 106. The front blade slot 206 is defined between the first end 218 and the spring contact 204. The rear blade slot 208 is open at the rear 212. The rear blade slot 208 is defined between the second end 220 and the spring contact 204. In the illustrated embodiment, the spring contact 204 closes the rear blade slot 208 at the front 210. Optionally, the front blade slot 206 may be open at the rear 212.

The spring contact 204 extends into the cavity 202 between the front blade slot 206 and the rear blade slot 208. In the illustrated embodiment, the spring contact 204 extends from the second end 220. In an exemplary embodiment, the spring contact 204 is wrapped around and folded over on itself within the cavity 202 to define a first mating interface 240 configured to engage the first blade terminal 106 when received in the front blade slot 206 and a second mating interface 242 configured to engage the second blade terminal 108 when received in the rear blade slot 208.

The spring contact 204 includes a base 244 and a plurality of beams 246 extending from the base 244. In the illustrated embodiment, the base 244 is provided at the front 210 of the box 200. The base 244 closes the rear blade slot 208. The beams 246 are cantilevered from the base 244. The beams 246 are movable independent of each other. Each of the beams 246 includes a first portion 248 extending from the base 244 and a second portion 250 extending from the first portion 248 to a distal end 252 of the beam 246. The second portion 250 is folded under the first portion 248. The first portion 248 defines the first mating interface 240 and the second portion 250 defines the second mating interface 242. The beam 246 includes a folded over portion 254 at the interface between the first and second portions 248, 250. In the illustrated embodiment, the folded over portion 254 is approximately aligned with the rear 212 of the box 200.

Optionally, the first portion 248 extends between the front 210 and the rear 212 generally parallel to the second end 220. The front blade slot 206 is defined between the first portion 248 and the first end 218. The front blade slot 206 is open at the front 210, and optionally may be open at the rear 212. In an exemplary embodiment, the first portion 248 includes a pad 256 defining the first mating interface 240. The pad 256 is a bump or protrusion extending into the front blade slot 206 to engage the first blade terminal 106 when received therein. The pad 256 may be aligned with the pad 226 at the first end 218. For example, the pad 256 may be approximately centered between the front 210 and the rear 212. The front blade slot 206 is narrower between the pads 256, 226 and wider at the opening at the front 210. When the first blade terminal 106 is received in the front blade slot 206, the first end 218 may be deflected upward and the spring contact 204 may be deflected downward to accommodate the first blade terminal 106. Such deflection causes an internal spring bias in the box 200 at the first end 218 and in the spring contact 204 such that the box 200 presses against one side of the first blade terminal 106 and the spring contact 204 presses against an opposite side of the first blade terminal 106 to ensure a strong mechanical and electrical connection between the receptacle terminal 110 and the first blade terminal 106.

Optionally, the second portion 250 extends from the first portion 248 to the distal end 252. The second portion 250 may be angled relative to the first portion 248 toward the second end 220. For example, the second portion 250 may be nonparallel to the first portion 248. In an exemplary embodiment, the distal end 252 is cupped at a pad 258 defining the second mating interface 242. For example, the pad 258 is curved such that the second mating interface 242 is the lowest portion of the second portion 250. In an exemplary embodiment, the second end 220 has a pad 260 extending into the cavity 202. The pad 260 may be stamped and/or formed from the second end 220. The pad 260 is a bump or protrusion extending into the rear blade slot 208 to engage the second blade terminal 108 when received therein. The pad 260 may be aligned with the pad 258. The rear blade slot 208 is narrower between the pads 258, 260 and wider at the opening at the rear 212. When the second blade terminal 108 is received in the rear blade slot 208, the pad 260 may be deflected downward and the spring contact 204 may be deflected upward to accommodate the second blade terminal 108. Such deflection causes an internal spring bias in the spring contact 204 to ensure a strong mechanical and electrical connection between the receptacle terminal 110 and the second blade terminal 108.

The first mating interface 240 has multiple points of contact with the first blade terminal 106. For example, each of the beams 246 includes a corresponding pad 256 configured to independently engage the first blade terminal 106. The second mating interface 242 has multiple points of contact with the second blade terminal 108. For example, each of the beams 246 includes a corresponding pad 258 configured to independently engage the second blade terminal 108. Optionally, the second end 220 may have multiple pads 260 defining a mating interface having multiple points of contact with the second blade terminal 108.

Figure 6:
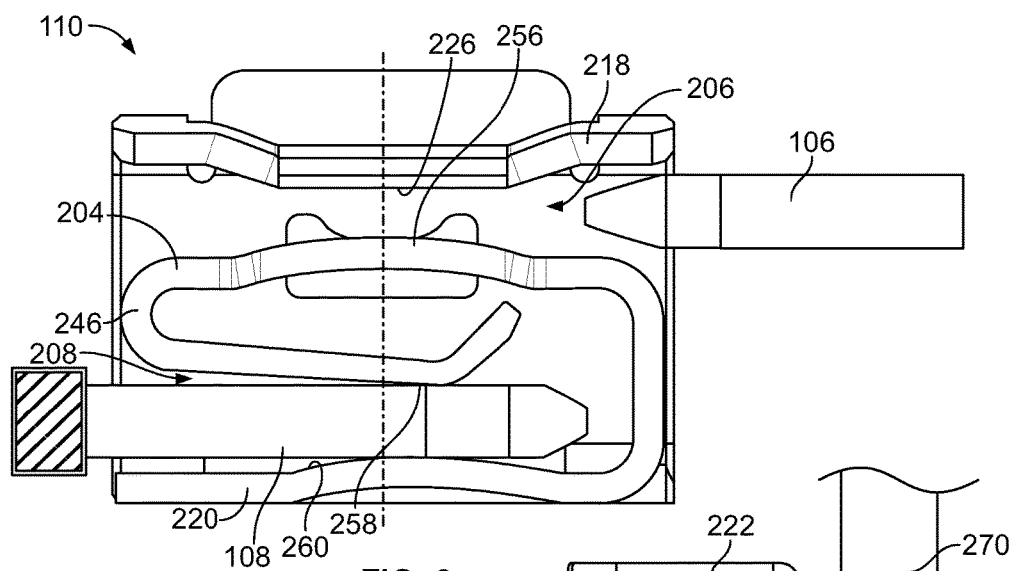
FIG. 6 is a cross-sectional view of the receptacle terminal showing blade terminals.

FIG. 6 is a cross-sectional view of the receptacle terminal 110 coupled to the second blade terminal 108 showing the first blade terminal 106 poised for mating with the receptacle terminal 110. During assembly, the receptacle terminal 110 is coupled to the second blade terminal 108 by loading the receptacle terminal 110 onto the second blade terminal 108. The second blade terminal 108 is received in the rear blade slot 208. The second blade terminal 108 is captured between the spring contact 204 and the second end 220. The second blade terminal 108 is hinged between the pad 260 and the pads 258 of the beams 246 of the spring contact 204. The spring contact 204 may be at least partially deflected when coupled to the second blade terminal 108. For example, the spring contact 204 may be pressed toward the first end 218.

During assembly, the first blade terminal 106 is coupled to the receptacle terminal 110 by loading the first blade terminal 106 into the front blade slot 206. In the illustrated embodiment, the first blade terminal 106 may be loaded into the first blade slot 206 through the front 210; however, the first blade terminal 106 may be loaded into the first blade slot 206 through the rear 212 in other embodiments. The first blade terminal 106 is loaded between the spring contact 204 and the first end 218. In an exemplary embodiment, the spacing between the pads 256, 226 on the spring contact 204 and the first end 218, respectively, is narrower than a thickness of the first blade terminal 106. When the first blade terminal 106 is received between the pads 256, 226 the spring contact 204 and/or the first end 218 are deflected outward away from the first blade terminal 106. The first blade terminal 106 is resiliently captured between the pads 256, 226.

Figure 7:
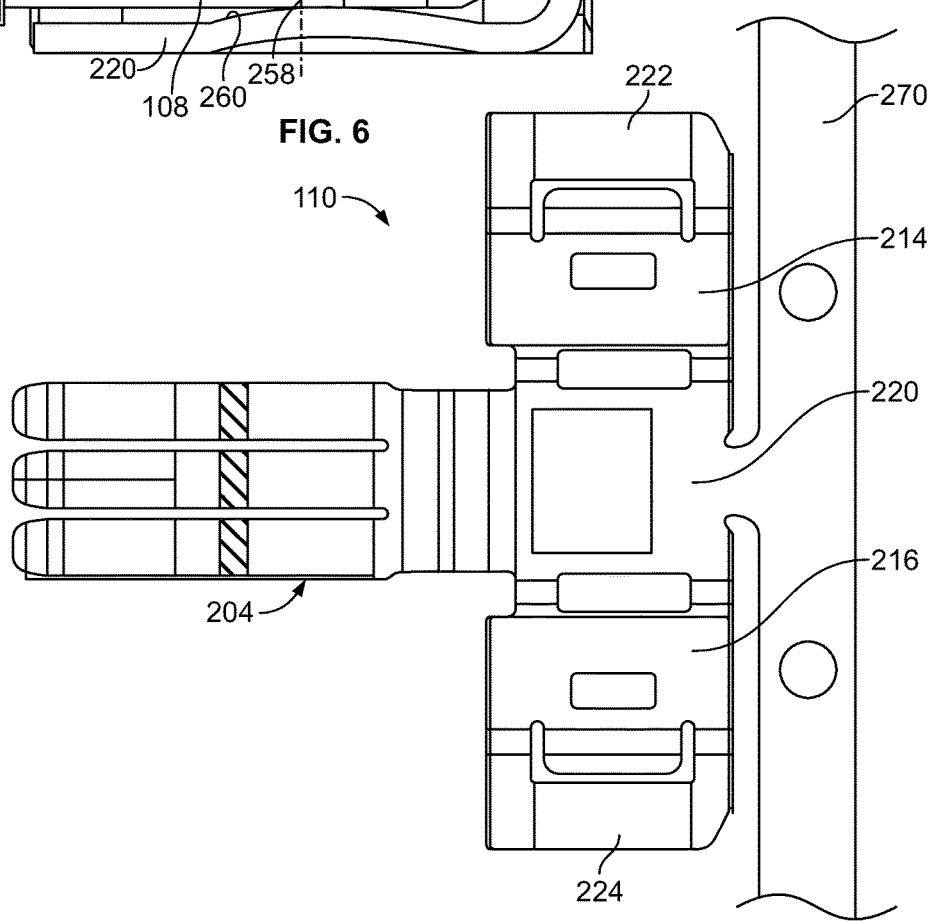
FIG. 7 is a plan view of the receptacle terminal in an unformed state on a carrier strip.

FIG. 7 is a plan view of the receptacle terminal 110 in an unformed state on a carrier strip 270. FIG. 7 shows the spring contact 204 extending from the second end 220, the first side 214 and the first flap 222 extending from the second end 220, and the second side 216 and the second flap 224 extending from the second end 220. The receptacle terminal 110 is formed by folding the spring contact 204 into shape and then forming up the sides 214, 216 around the spring contact 204 and forming the flaps 222, 224 in order to form the first end 218.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle terminal comprising:
   a box having a front and a rear, the box having first and second sides extending between the front and the rear, the box having first and second ends extending between the front and the rear, the box defining a cavity;
   a front blade slot open at the front configured to receive a first blade terminal;
   a rear blade slot open at the rear configured to receive a second blade terminal; and
   a spring contact in the cavity between the front blade slot and the rear blade slot, the spring contact having a first mating interface configured to engage the first blade terminal when received in the front blade slot, the spring contact having a second mating interface configured to engage the second blade terminal when received in the rear blade slot;
   wherein the first end is split including a first flap and a second flap facing each other at a seam, the first flap and the second flap being independently movable relative to each other.

2. The receptacle terminal of claim 1, wherein the first flap extends from the first side to the seam and the second flap extends from the second side to the seam.

3. The receptacle terminal of claim 2, wherein the first flap and the first side are spread apart from the second flap and the second side by the first blade terminal when the first blade terminal is loaded in the first blade slot.

4. The receptacle terminal of claim 1, wherein the box is an open box configured to be enlarged when the first blade terminal is loaded in the first blade slot.

5. The receptacle terminal of claim 1, wherein the first and second sides and the first and second flaps are elastically deformed when the first blade terminal is loaded in the first blade slot such that the first and second flaps are spring biased against the first blade terminal.

6. The receptacle terminal of claim 1, wherein the first flap and the second flap are angled inward into the cavity nonparallel to the second end.

7. The receptacle terminal of claim 1, wherein the first side is perpendicular to the second end and the second side is perpendicular to the second end and parallel to the first side, and wherein the first flap is non-perpendicular to the first side and the second flap is non-perpendicular to the second side.

8. The receptacle terminal of claim 1, wherein the spring contact includes a plurality of parallel beams independently movable relative to each other.

9. The receptacle terminal of claim 1, wherein the spring contact includes a base and a plurality of beams extending from the base to the first mating interface and the second mating interface.

10. The receptacle terminal of claim 9, wherein each of the beams includes a first portion extending from the base and a second portion extending from the first portion to a distal end of the beam, the second portion being folded under the first portion, the first portion defining the first mating interface, the second portion defining the second mating interface.

11. The receptacle terminal of claim 1, wherein the first end has a first end mating interface having multiple points of contact defined by the first flap and the second flap.

12. A receptacle terminal comprising:
a box having a front and a rear, the box having first and second sides extending between the front and the rear, the box having first and second ends extending between the front and the rear, the box defining a cavity;
a spring contact in the cavity, the spring contact having a first mating interface configured to engage a first blade terminal, the spring contact having a second mating interface configured to engage a second blade terminal;
a front blade slot between the first end and the spring contact, the front blade slot being open at the front to receive the first blade terminal; and
a rear blade slot between the second end and the spring contact, the rear blade slot being open at the rear to receive the second blade terminal;
wherein the first end has a first end mating interface having multiple points of contact for engaging the first blade terminal at discrete locations and wherein the first mating interface of the spring contact has multiple points of contact for engaging the first blade terminal at discrete locations.

13. The receptacle terminal of claim 12, wherein the first end is split including a first flap and a second flap facing each other at a seam, the first flap and the second flap being independently movable relative to each other.

14. The receptacle terminal of claim 13, wherein the first flap extends from the first side to the seam and the second flap extends from the second side to the seam.

15. The receptacle terminal of claim 13, wherein the first and second sides and the first and second flaps are elastically deformed when the first blade terminal is loaded in the first blade slot such that the first and second flaps are spring biased against the first blade terminal.

16. The receptacle terminal of claim 12, wherein the box is an open box configured to be enlarged when the first blade terminal is loaded in the first blade slot.

17. The receptacle terminal of claim 12, wherein the spring contact includes a plurality of parallel beams independently movable relative to each other.

18. The receptacle terminal of claim 12, wherein the spring contact includes a base and a plurality of beams extending from the base to the first mating interface and the second mating interface.

19. A junction box configured to hold an electronic component having a first blade terminal and an electronic device having a second blade terminal, the junction box comprising:
a housing holding the electronic device; and
a receptacle terminal coupled to the second blade terminal of the electronic device, the receptacle terminal comprising a box having a front and a rear, the box having first and second sides extending between the front and the rear, the box having first and second ends extending between the front and the rear, the box defining a cavity, a front blade slot open at the front and a rear blade slot open at the rear, the receptacle terminal comprising a spring contact in the cavity between the front blade slot and the rear blade slot, the spring contact having a first mating interface and a second mating interface, the receptacle terminal receiving the second blade terminal in the rear blade slot between the second mating interface of the spring contact and the second end, the receptacle terminal receiving the first blade terminal in the front blade slot between the first mating interface of the spring contact and the first end, the first end being split including a first flap and a second flap facing each other at a seam, the first flap and the second flap being independently movable relative to each other to engage the first blade terminal.

20. The junction box of claim 19, wherein the first and second sides and the first and second flaps are elastically deformed when the first blade terminal is loaded in the first blade slot such that the first and second flaps are spring biased against the first blade terminal.

* * * * *